UNITED STATES PATENT OFFICE.

JACOB FRIEDMAN, OF NEW YORK, N. Y.

PROCESS OF PREPARING CEREAL FOOD.

1,393,997. Specification of Letters Patent. Patented Oct. 18, 1921.

No Drawing. Application filed November 19, 1919. Serial No. 339,013.

*To all whom it may concern:*

Be it known that I, JACOB FRIEDMAN, a citizen of the United States, residing at New York city, in the county of New York and State of New York, have invented certain new and useful Improvements in Processes of Preparing Cereal Food, of which the following is a specification.

This invention relates to food products, and particularly to the production of an "instantaneous" food product, that is a food product which does not need to be cooked immediately before using, and more particularly to a process of producing cereal food in a form ready to serve.

The general object of my invention is to provide a process of preparing oatmeal, hominy or like cereals by which the cereal is placed in condition to eat without the necessity of cooking the cereal just before it is served, and in this connection to provide a process which, while cooking the cereal, does not cause any loss in its food properties, but which, on the contrary, increases the carbo-hydrates, thus increasing its food value.

Other objects will appear in the course of the following description.

In carrying out the process which forms the subject matter of this invention, I dispose dry oatmeal or other cereal to be treated, such as cracked wheat, hominy, etc., within a hollow, closed container and dispose this container within an outer container or steam jacket entirely surrounding the first container. To the steam jacket or space between the inner container and outer container, I admit superheated steam at a temperature of approximately 175° C. This will raise the temperature of the inner container in which the cereal is placed to from 110° to 170° C. This temperature is kept up for from 25 minutes to two hours, preferably about one hour and twenty minutes. The pressure within the inner container will be from five to eight atmospheres during this period, while the pressure in the outer container or steam jacket will be approximately 45 atmospheres. The heat is then reduced so that the heat within the inner container is approximately 45° C. and it is held at this point from two to three hours. The food, such as oatmeal, hominy, cracked wheat, and the like is then ready to be boxed and shipped. The cereal is in practically the same form, as far as appearance goes, as it was when it was placed in the container. In other words, in the form of perfectly dry granules or flakes. The cereal is then ready to be eaten without any further cooking. The cereal may be mixed with hot water to form a gruel and immediately eaten, or it may be mixed with hot milk or cream, or it may be eaten cold, that is with cold milk or cream.

The advantage of this process is obvious. The oatmeal or other cereal is "instantaneous," that is it does not have to be cooked just before being served. Furthermore, the cereal has lost none of its nitrogenous value. This is because the cooking of the material takes place in an absolutely closed container and under pressure. In all the processes known to me, the cereal is cooked in an open vessel and this permits the escape and loss of the nitrogenous values in the food and very greatly reduces the value of the cereal as a food. In my process, not only are no nitrogenous values lost, but the process causes an increase of carbo-hydrates, as the dextrin in the cereal becomes a dextrose. In other words, the heat to which it is submitted changes the starch to sugar, thus requiring less sugar when the cereal is eaten.

It will be obvious that the means used for cooking the cereal is of a very simple and well known character of the autoclave type. It is to be understood that the cereal, when it is placed within the inner container, is in an entirely dry condition and that no water or other liquid is placed within this container while the cereal is being cooked.

While I have above referred to this process as being used for the production of a cereal food from oats, wheat, and cracked corn, it is obvious that my invention includes the production of a cereal food from any cracked or crushed grain.

I claim:—

1. A process of preparing cereal which consists in subjecting the cereal in dry form to a cooking heat and pressure in an entirely closed vessel.

2. A process of preparing a cereal food which consists in disposing the cereal in dry form within a hollow, closed vessel and heating the vessel by superheated steam.

3. A process of preparing cereal food which consists in inclosing a cereal in a dry form within an entirely closed container, disposing the container within a closed, outer container, and filling the space between the two containers with steam at a temperature of about 175° C. and at a pressure of approximately 45 atmospheres to thereby produce a temperature of approximately 110° C., and a pressure of approximately from 5 to 8 atmospheres within the inner container until the cereal is cooked.

4. A process of preparing cereal food which consists in inclosing a cereal in a dry form within an entirely closed container, disposing the container within a closed, outer container, and filling the space between the two containers with steam at a temperature of about 175° C. and at a pressure of approximately 45 atmospheres to thereby produce a temperature of approximately 110° C., in the inner container and a pressure of approximately from 5 to 8 atmospheres, holding said temperature and pressure for a period between one and two hours, and then reducing the temperature to approximately 45° C. and retaining it at this point from two to three hours.

In testimony whereof I hereunto affix my signature.

JACOB FRIEDMAN.